(12) United States Patent
Tomoda et al.

(10) Patent No.: US 8,144,373 B2
(45) Date of Patent: Mar. 27, 2012

(54) IMAGE WRITING DEVICE

(75) Inventors: Kyotaro Tomoda, Ebina (JP); Naoki Hiji, Ebina (JP); Yasunori Saito, Ebina (JP); Masahiro Sato, Ebina (JP); Tsutomu Ishii, Ebina (JP); Shigehiko Sasaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 725 days.

(21) Appl. No.: 12/134,765

(22) Filed: Jun. 6, 2008

(65) Prior Publication Data

US 2009/0086281 A1   Apr. 2, 2009

(30) Foreign Application Priority Data

Oct. 2, 2007  (JP) ................. 2007-259018

(51) Int. Cl.
- *H04N 1/04* (2006.01)
- *H04N 1/024* (2006.01)
- *H04M 1/00* (2006.01)
- *B41J 2/175* (2006.01)
- *G06K 9/00* (2006.01)

(52) U.S. Cl. .......... 358/474; 358/473; 358/497; 347/87; 382/101

(58) Field of Classification Search .................. 358/474, 358/473, 497; 347/87; 455/557; 382/101
See application file for complete search history.

(56) References Cited

U.S. PATENT DOCUMENTS

| | | | | |
|---|---|---|---|---|
| 5,854,694 A | * | 12/1998 | Payne et al. | 358/473 |
| 2005/0002068 A1 | * | 1/2005 | Wakatabi et al. | 358/474 |
| 2007/0024924 A1 | * | 2/2007 | Ikeno et al. | 358/474 |
| 2008/0049972 A1 | * | 2/2008 | Blackwell et al. | 382/101 |
| 2008/0182620 A1 | * | 7/2008 | Lors | 455/557 |

FOREIGN PATENT DOCUMENTS

JP  A-05-221054  8/1993

* cited by examiner

*Primary Examiner* — Charlotte M Baker
*Assistant Examiner* — Rury Grisham
(74) *Attorney, Agent, or Firm* — Oliff & Berridge, PLC

(57) ABSTRACT

An image writing device is provided and includes: a case including an accommodating part that accommodates a plurality of display media stacked, a entrance and exit port which is communicated with the accommodating part and through which the display media enter and exit the case, and a window through which an image on a display surface of a display medium can be externally browsed, the image being written in the display medium by applying external stimulation; a conveying part that conveys the display medium into and out of the case through the entrance and exit port; and a writing part arranged near the entrance and exit port of the case, the writing part applying the external stimulation to the display medium to write the image in the display medium when the display medium is conveyed into or out of the case by way of the conveying part.

11 Claims, 18 Drawing Sheets

# IMAGE WRITING DEVICE

CROSS-REFERENCE TO RELATED APPLICATION

This application is based on and claims priority under 35 USC §119 from Japanese Patent Application No. 2007-259018 filed Oct. 2, 2007.

BACKGROUND (i) Technical Field

The present invention relates to an image writing device.

(ii) Related Art

A display and printer device has been proposed that includes a printer feature to record information onto a reversible recording medium sheet capable of repeatedly writing and erasing information and a display feature to display information recorded on the recording medium sheet.

SUMMARY

According to an aspect of the invention, there is provided an image writing device including:

a case including an accommodating part that accommodates a plurality of display media stacked, a entrance and exit port which is communicated with the accommodating part and through which the display media enter and exit the case, and a window through which an image on a display surface of a display medium can be externally browsed, the image being written in the display medium by applying external stimulation;

a conveying part that conveys the display medium into and out of the case through the entrance and exit port; and a writing part arranged near the entrance and exit port of the case, the writing part applying the external stimulation to the display medium to write the image in the display medium when the display medium is conveyed into or out of the case by way of the conveying part.

BRIEF DESCRIPTION OF THE DRAWINGS

Embodiments of the present invention will be described in detail based on the following figures, wherein.

DETAILED DESCRIPTION

First Embodiment

Figure 1:
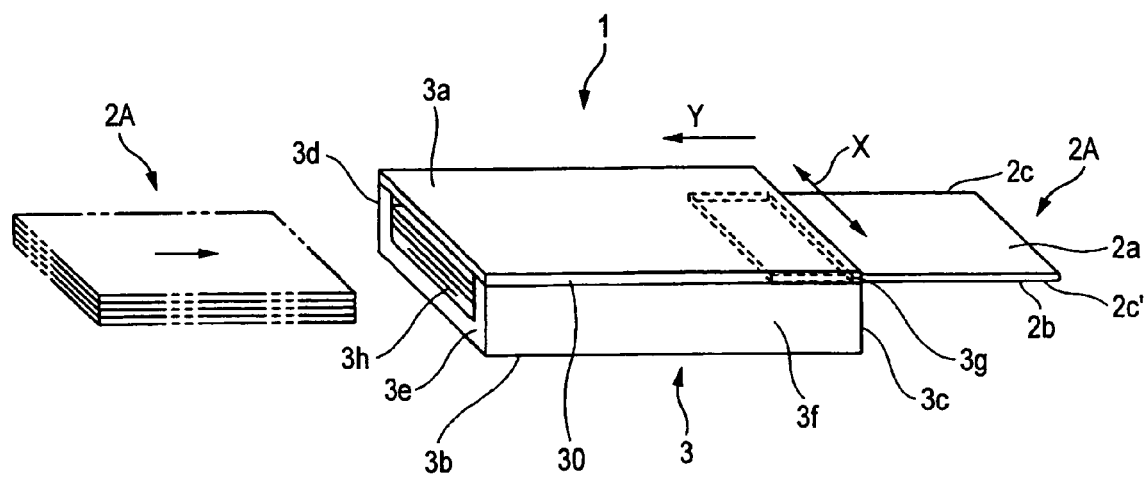
FIG. 1 is a perspective view showing an image writing device according to a first exemplary embodiment of the invention.

FIG. 1 is a perspective view showing an image writing device according to a first exemplary embodiment of the invention. The image writing device 1 is a scan-type optical writing device and includes: a device body 3 as an almost rectangular case including an entrance and exit port 3g for taking in and out a display medium 2A and an insertion port 3h into which a plurality of display media 2A can be inserted in a stacked state; and a writing head described later for scanning an image in a main scan direction X and a sub scan direction Y and writing the image onto the display medium 2A while the display medium 2A is conveyed into the device body 3 via the entrance and exit port 3g.

(Device Body)

The device body 3 has an almost rectangular shape including an upper surface 3a, a lower surface 3b, and side surfaces 3c to 3f. The device body 3 includes the entrance and exit port 3g in the side surface 3c, the insertion port 3h in the side surface 3e, and a transparent plate 30 as a window in the upper area.

The transparent plate 30 is formed by a translucent resin such as a methacrylic resin. The transparent plate 30 may be translucent or colored to a degree that an image displayed on the surface 2a of the display medium 2A as a display surface is visible. An opening may be arranged as a window instead of a transparent plate 30.

(Types of Display Medium)

The display medium 2A is an optical writing type display medium with a shape of an almost low-profile rectangle and having a memory characteristic for holding a display image in the absence of a power source. The display medium 2A includes a laminated body composed of a liquid crystal layer made of laminated cholesteric liquid crystals or the like and an photoconductive layer and a pair of electrodes arranged at both ends of the laminated body and is designed to write an image through application of a voltage across a pair of electrodes and irradiation of light. The display medium 2A is available in a front writing type for irradiating light onto the front surface 2a to display an image and a rear writing type for irradiating light onto the rear surface 2b. This embodiment uses the rear writing type.

(Characteristic of Liquid Crystal Layer)

Figure 2:
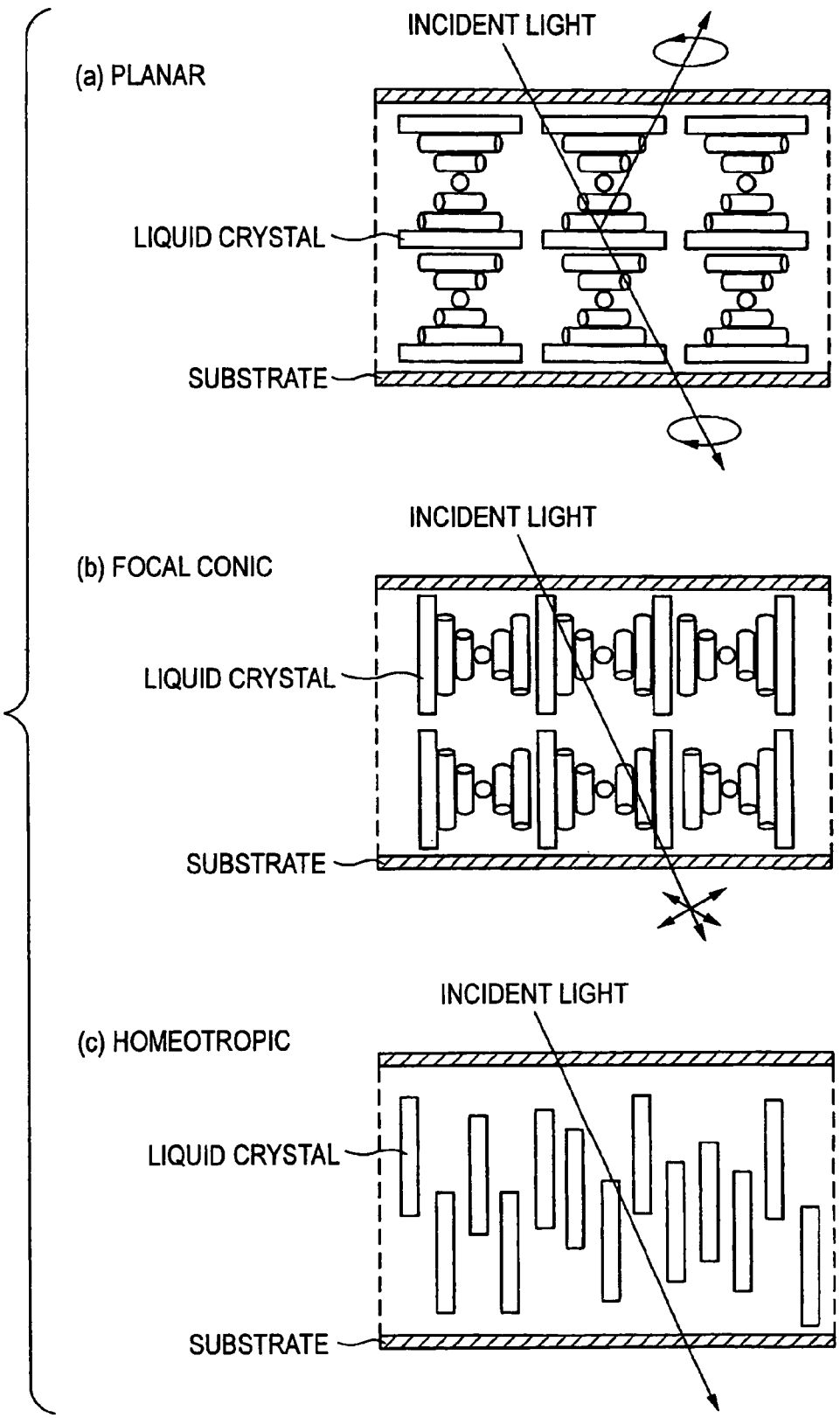
FIG. 2 shows a relationship between the molecular orientation and optical characteristic of a cholesteric liquid crystal.

FIG. 2 shows a relationship between the molecular orientation and optical characteristic of a cholesteric liquid crystal. The planar phase shown by the cholesteric liquid crystal of the liquid crystal layer causes a selective reflection phenomenon in which the light incident parallel to a spiral axis is divided into rightward rotary polarization and leftward rotary polarization, a circular polarization component matching in the torsional direction of the spiral is Bragg-reflected, and the remaining light components are transmitted. The center wavelength $\lambda$ and the reflected wavelength width $\Delta\lambda$ of the reflected light is respectively represented by $\Delta = n \cdot p$ and $\Delta\lambda = \Delta n \cdot p$ assuming the spiral pitch as p, mean refraction index in a plane orthogonal to the spiral axis as n, and birefringence index as $\Delta n$. Te reflected light from the cholesteric liquid crystal of the planar phase shows a crisp color dependent on the spiral pitch.

The cholesteric liquid crystal having positive dielectric anisotropy shows three states: a planar phase in which the spiral axis is perpendicular to the cell surface and the above selective reflection phenomenon takes place with respect to an incident light as shown in FIG. 2(a); a focal conic phase in which the spiral axis is almost parallel to the cell surface and an incident light is transmitted while somewhat scattering forward as shown in FIG. 2(b); and a homeotropic phase in which the spiral structure is becomes untied and a liquid crystal director faces in the direction of an electric field, and an incident light is transmitted almost completely as shown in FIG. 2(c).

Among the three states, the planar phase and the focal conic phase can exist in a bistable fashion in the absence of electric fields. Thus, the phase state of the cholesteric liquid crystal is not uniquely defined with respect to the field strength applied to the cholesteric liquid crystal. In case the planar phase is the initial state, the cholesteric liquid crystal changes its phase state in the order of the planar phase, focal conic phase, and homeotropic phase as the field strength increases. In case the focal conic phase is the initial state, the cholesteric liquid crystal changes its phase state in the order of the focal conic phase and homeotropic phase as the field strength increases.

In case the field strength applied to the liquid crystal layer is suddenly set to zero, the planar phase and the focal conic phase maintains the current states. The homeotropic phase changes to the planar phase.

In particular, a liquid crystal layer of the PNLC (Polymer-Networked Liquid Crystal) structure or PCLC (Polymer-Dispersed Liquid Crystal) structure obtained by adding a polymer to a cholesteric liquid crystal shows an enhanced bistability of the planar phase and the focal conic phase in the absence of electric fields by way of interference at the interface between the cholesteric liquid crystal and the polymer (anchoring effect), thus maintaining for a long period the state just after a pulse signal is applied.

Figure 3:
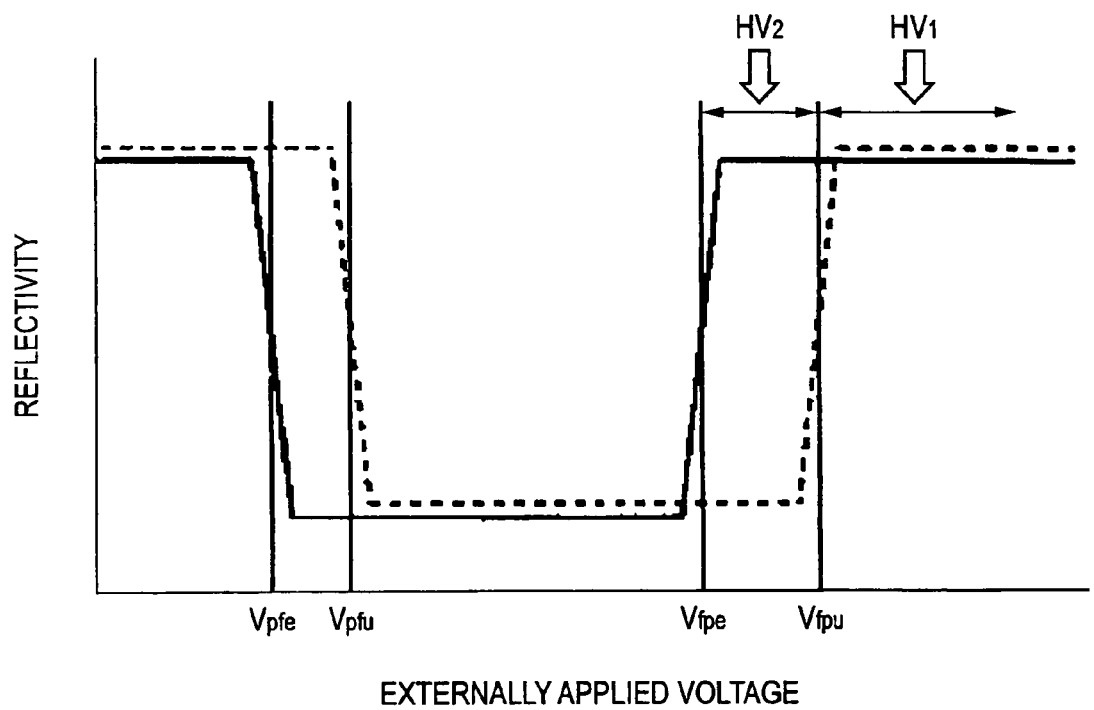
FIG. 3 shows a switching behavior of a liquid crystal layer in response to a voltage applied across a pair of electrodes.

FIG. 3 shows a switching behavior of the liquid crystal layer in response to a voltage applied across a pair of electrodes (externally applied voltage). Solid lines indicate the behavior upon exposure and dashed lines indicate the behavior upon non-exposure.

Assume the threshold voltage for a change from the planar phase to the focal conic phase of the liquid crystal layer upon exposure as Vpfe, the threshold voltage for a change from the planar phase to the focal conic phase of the liquid crystal layer upon non-exposure as Vpfu, the threshold voltage for a change from the focal conic phase to the planar phase of the liquid crystal layer upon exposure as Vfpe, and the threshold voltage for a change from the focal conic phase to the planar phase of the liquid crystal layer upon non-exposure as Vfpu.

The cholesteric liquid crystal of the liquid crystal layer turns into the planar phase when a resetting voltage $HV_1$ of Vfpe or above is applied with the liquid crystal exposed. The planar phase has a memory characteristic so that the liquid crystal layer maintains a high reflectivity even in case the voltage $HV_1$ is no longer applied.

Next, a writing voltage $HV_2$ in a rage between Vfpe and Vfpu inclusive is applied in writing operation. The planar phase is maintained and shows selective reflection until exposure starts.

When exposure starts, the voltage applied to the liquid crystal layer increases and the liquid crystal layer changes from the planar phase to the homeotropic phase. When exposure ends, the homeotropic phase changes to the planar phase and the liquid crystal layer shows a high reflectivity.

A portion that is left non-exposed retains the focal conic phase throughout formed by the application of the voltage $HV_2$ of Vpfu or above and shows a high reflectivity.

(Internal Structure of Device Body)

Figure 4:
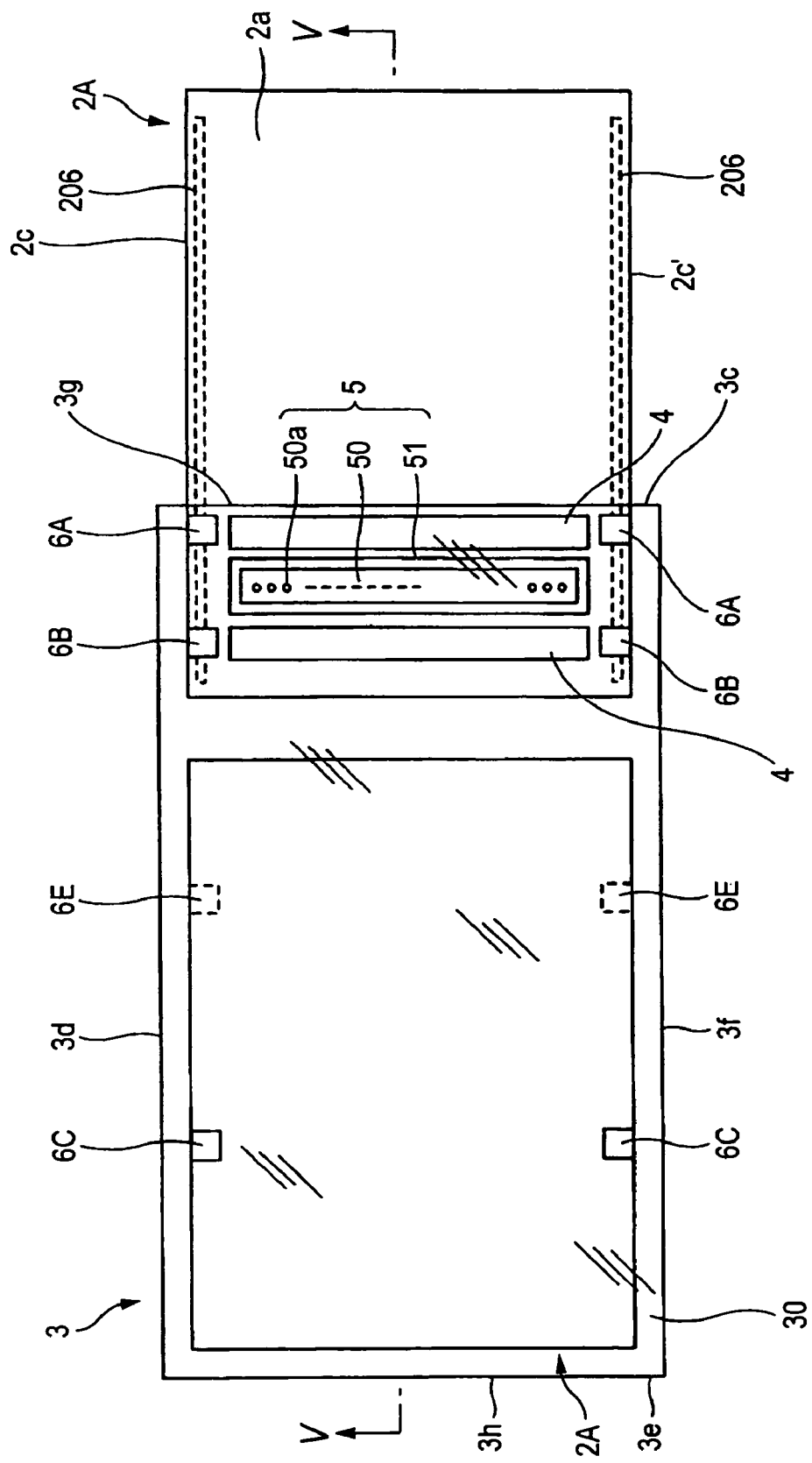
FIG. 4 is a plan view of the image writing device shown in FIG. 1.
Figure 5:
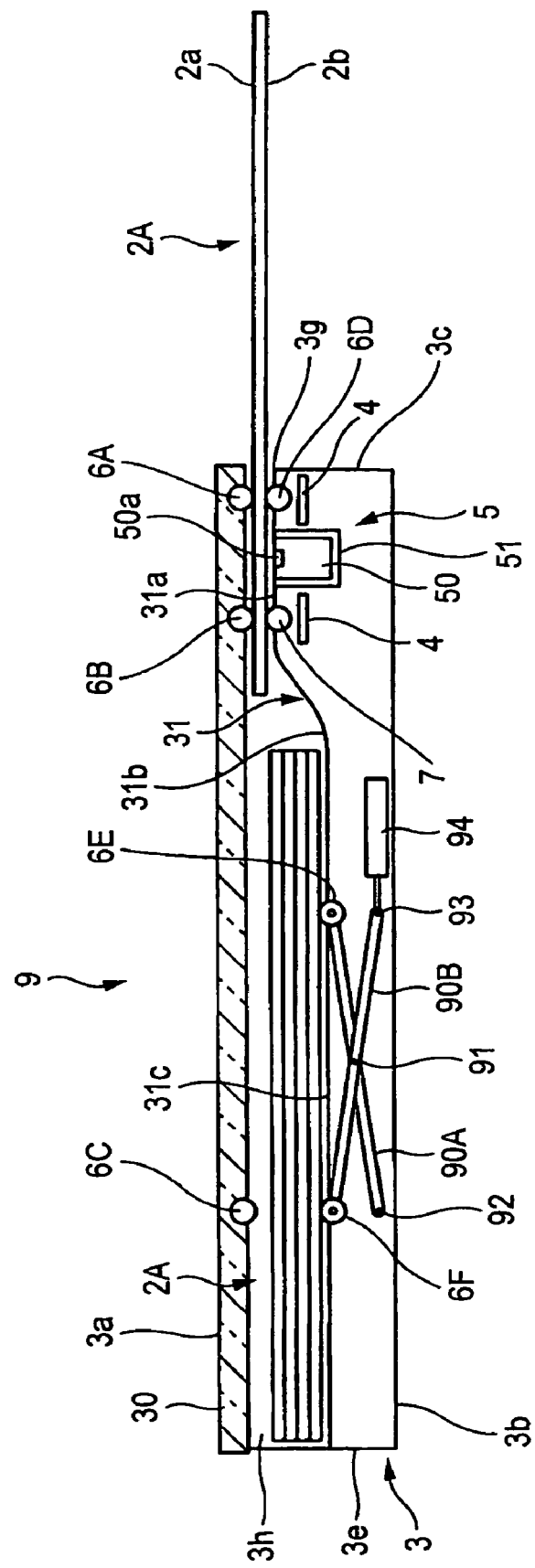
FIG. 5 is a cross-sectional view of FIG. 4 taken along line V-V.
Figure 6:
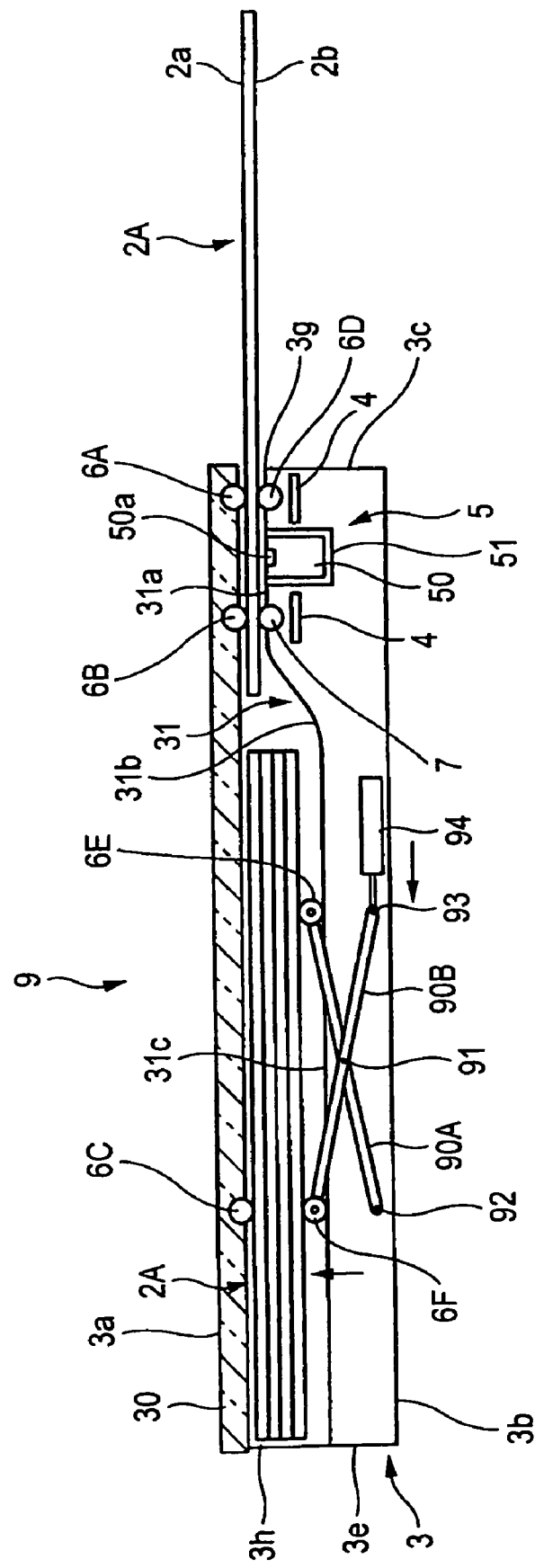
FIG. 6 is a cross-sectional view showing an operation of the elevating mechanism shown in FIG. 5.

FIG. 4 is a plan view of the image writing device. FIG. 5 is a cross-sectional view of FIG. 4 taken along line V-V. FIG. 6 is across-sectional view of FIG. 4 taken along line V-V showing the operation of the elevating mechanism of the image writing device shown in FIG. 5.

As shown in FIGS. 4 and 5, the device body 3 has a resetting light source 4 and a writing head 5 arranged on the side of the entrance and exit port 3g.

The resetting light source 4 may be an EL (electroluminescence) panel or a light-emitting diode panel including light-emitting diodes arranged two-dimensionally.

As shown in FIG. 4, the writing head 5 includes a light-emitting element array 50 including a plurality of light-emitting elements 50a arranged in one dimension in a main scan direction X and a case 51 made of a metal or the like covering the light-emitting element array 50.

The light-emitting element array 50 may use light-emitting elements 50a such as lasers and light-emitting diodes. This embodiment uses, for example, a light-emitting element array having a resolution of 1600 dpi.

As shown in FIGS. 4 and 5, the device body 3 includes conveyer rollers 6A through 6F for conveying the display medium 2A while being in contact with the front surface 2a and rear surface 2b near the side surfaces 2c and 2c' of the display medium 2A. On the side of the entrance and exit port 3g opposed to the conveyer roller 6B is arranged a power feed roller 7 for power feeding and conveyance of the display medium 2A. Inside the device body 3 is arranged a guide surface 31 for guiding the display medium 2A.

The guide surface 31 is composed of a flat surface 31a arranged bear the entrance and exit port 3g and parallel to the transparent plate 30, a flat surface 31c for accommodating a plurality of display media 2A between the flat surface 31c and the transparent plate 30, and an S-shaped surface 31b having an S shape connecting both flat surfaces 31a, 31c. The guide surface 31 is formed by a resin having a low friction coefficient such as a fluoroplastic resin or a metal with a coating of a resin having a low friction coefficient such as a fluoroplastic resin in order to smoothly deliver the display medium 2A in the lowermost layer to the entrance and exit port 3g among the plurality of display media 2A arranged in an accommodating part 32.

(Elevating Mechanism)

In the lower area of the device body 3 is arranged an elevating mechanism 9 for elevating/lowering the display medium 2A. The elevating mechanism 9 has a structure, like a pantograph system, in which arms 90A, 90B forming a pair are combined in an X shape with a junction point 91, the conveyer rollers 6E, 6F are mounted on the upper ends of the pair of arms 90A, 90B, the lower end of one arm 90A is used as a fixed fulcrum 92 for rotatably fixing to the device body 3, and the lower end of the other arm 90B is used as a movable fulcrum 93 movable in horizontal direction while ganged with an elevating solenoid 94. The pair of arms 90A, 90B and the elevating solenoid 94 are arranged on the left and right sides in the conveying direction.

When the rod of the elevating solenoid 94 is moved leftward in FIG. 5, a pair of arms 90A, 90B rises and the positions of the conveyer rollers 6E, 6F are elevated and the display medium 2A may be elevated until the display medium 2A abuts the conveyer roller 6C as shown in FIG. 6. This causes the display medium 2A to approach the transparent plate 30 thus making it easy to view the image displayed on the display medium 2A. When the rod of the elevating solenoid 94 is moved rightward in FIG. 6, the positions of the conveyer rollers 6E, 6F are lowered and the pair of arms 90A, 90B returns to the original position as shown in FIG. 5.

The elevating mechanism 9 also functions as a delivery mechanism by rotating the conveyer rollers 6E, 6F in the direction the display medium 2A moves toward the entrance and exit port 3g.

The conveyer rollers 6A through 6F are formed by a material such as a metal, rubber or a resin and are rotated by a motor (not shown).

The power feed roller 7 is formed by a conductive material such as a metal or a conductive rubber and comes into contact with a power receiving terminal 206 shown in FIG. 4 to feed power to the power receiving terminal 206.

(Display Medium)

Figure 7:
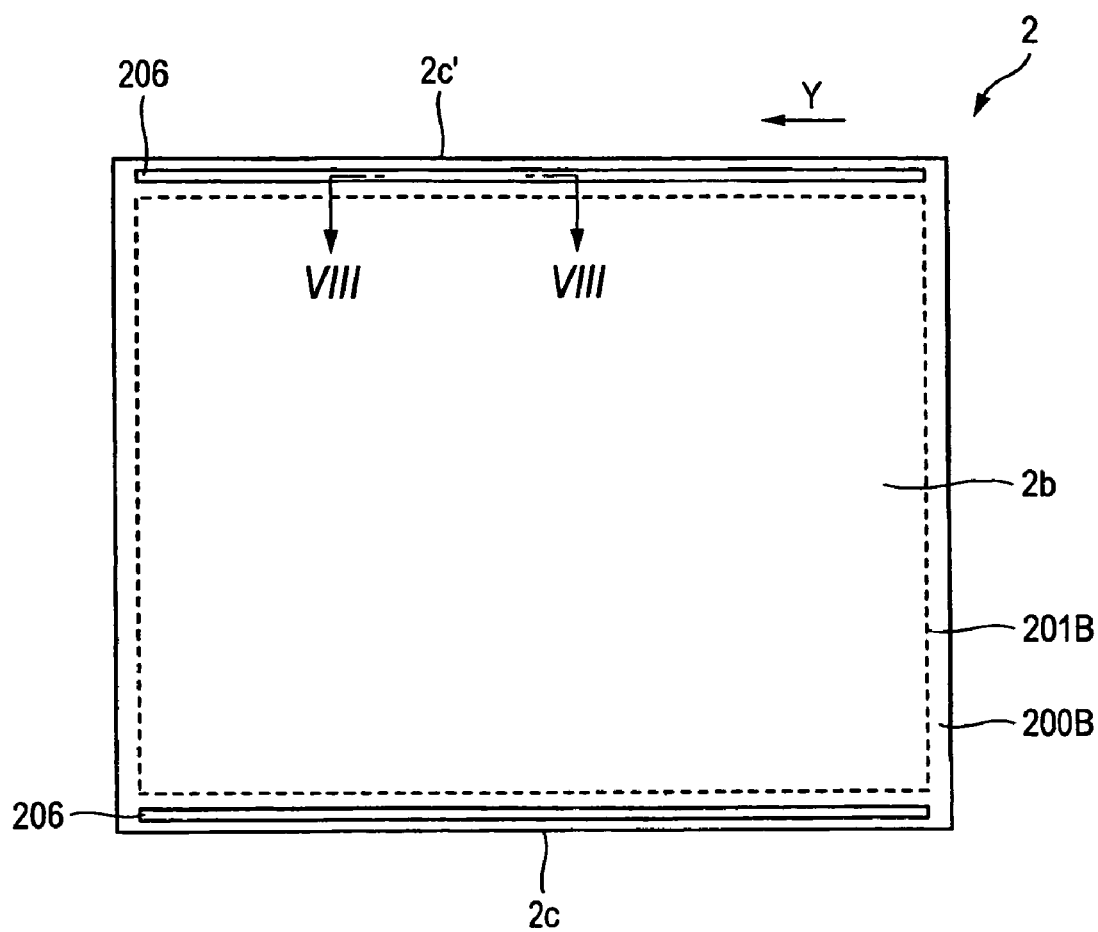
FIG. 7 is a plan view of the rear surface of a display medium.
Figure 8:
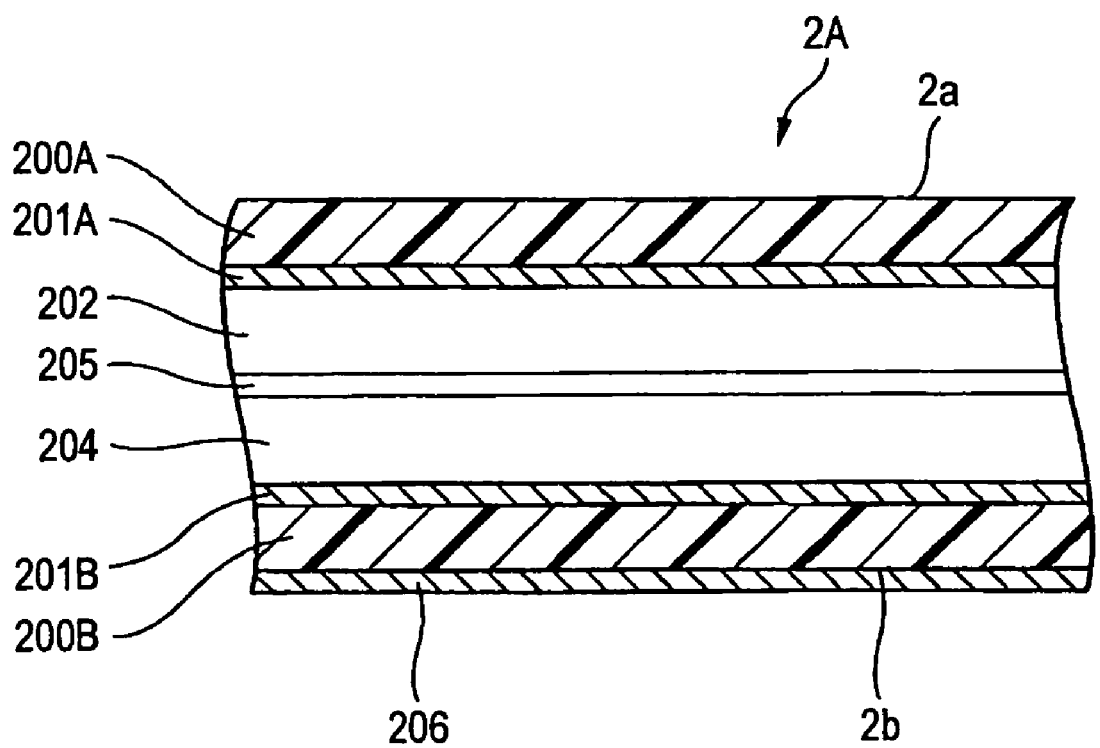
FIG. 8 is a cross-sectional view of main sections showing the layer configuration of a display medium.

FIG. 7 is a plan view of the rear surface of the display medium. FIG. 8 is a cross-sectional view of FIG. 7 taken along line VIII-VIII showing the layer configuration of the display medium 2A.

As shown in FIGS. 7 and 8, the display medium 2A includes two power receiving terminals 206 made of a conductive material such as copper or a copper alloy formed in the sub-scan direction Y on the rear surface 2b near the left and right side surfaces 2c, 2c'.

As shown in FIG. 8, the display medium 2A includes: transparent first and second substrates 200A, 200B arranged opposite to each other, the substrates 200A, 200B formed by PET (polyethylene terephthalate) or the like; a first electrode 201A that is a transparent overall electrode formed by an ITO (indium tin oxide) or the like inside the first substrate 200A; a second electrode 201B that is a transparent overall electrode formed by an ITO or the like inside the second substrate 200B; a liquid crystal layer 202 arranged inside the first electrode 201A and made of a cholesteric liquid crystal whose reflectivity changes with the applied voltage; a photoconductive layer 204 arranged relative to the liquid crystal layer 202 with a light-absorbing layer 205 placed in between, the resistance value of the photoconductive layer 204 decreasing with radiation of light; and the pair of power receiving terminals 206 formed on the rear surface 2b of the second substrate 200B.

One power receiving terminal 206 of the pair of power receiving terminals 206 is connected to the first electrode 201A via a conductive member (not shown). The other power receiving terminal 206 is electrically connected to the second electrode 201B via a connecting part (not shown) such as a through hole.

The photoconductive layer 204 is composed of a charge transport layer and a pair of charge generating layers laminated on both sides of the charge transport layer. This allows an AC voltage to be applied to the liquid crystal layer 202, thus suppressing deterioration of the liquid crystal layer 202 thereby reducing a driving voltage and ensuring longer service life of the display medium 2A.

(Control System of Image Writing Device)

Figure 9:
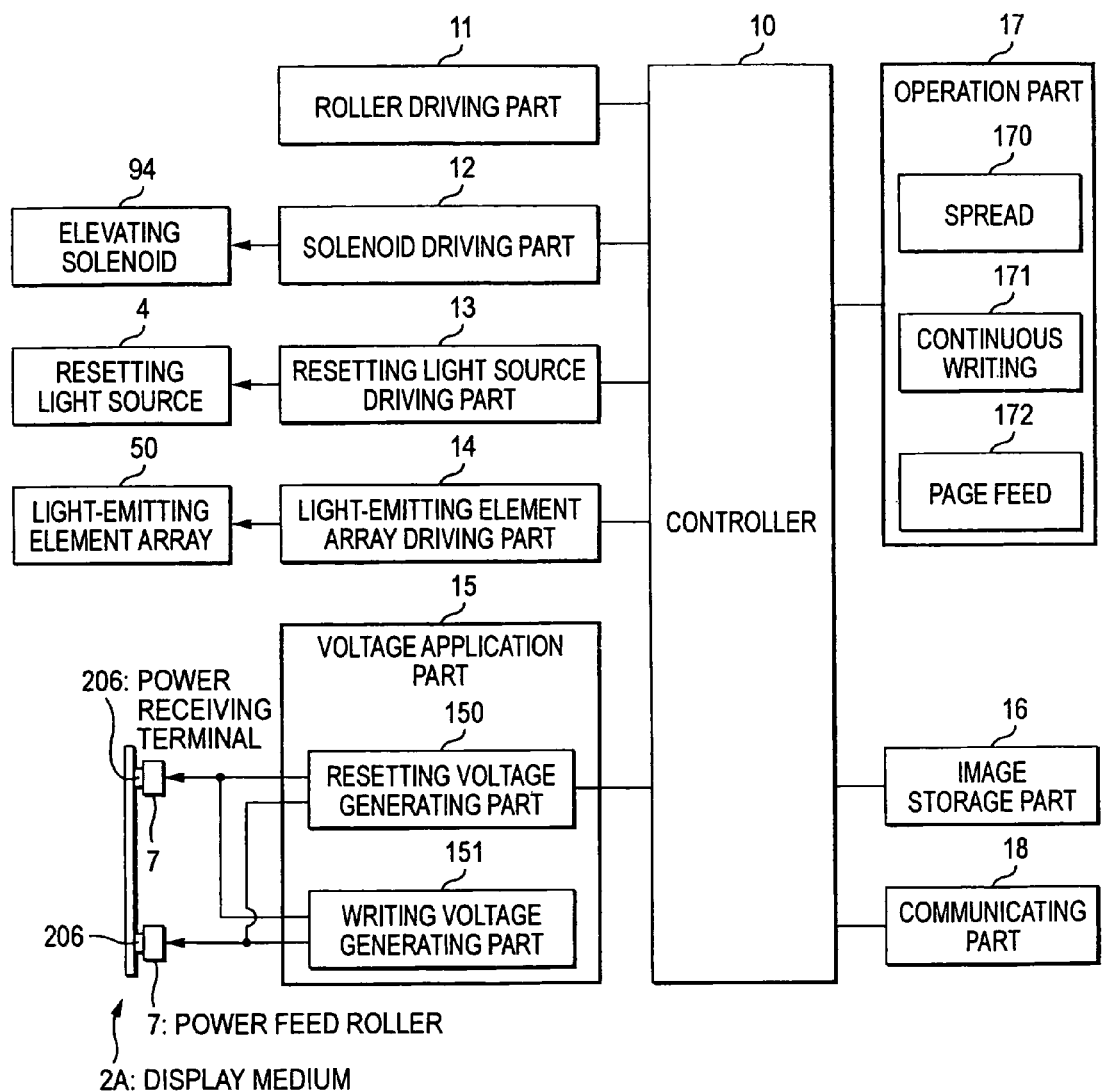
FIG. 9 is a block diagram of a control system of an image writing device according to the first exemplary embodiment of the invention.

FIG. 9 is a block diagram of the control system of the image writing device. The image writing device 1 includes a controller 10 for controlling the entire image writing device 1, a roller driving part 11 for driving conveyer rollers 6A through 6F and the power feed roller 7, a solenoid driving part 12 for driving the elevating solenoid 94, a resetting light source driving part 13 for driving the resetting a power source 4, a light-emitting element array driving part 14 for driving each light-emitting element 50a in the light-emitting element array 50 of the writing head 5, a voltage application part 15 for applying a voltage across the first and second electrodes 201A, 201B of the display medium 2A via the power feed roller 7 and the power receiving terminal 206, an image storage part 16 for storing an image data, an operation part 17 allowing mode selection, and communicating part 18 for communications to outside.

The voltage application part 15 includes a resetting voltage generating part 150 for generating a resetting voltage ($HV_1$) in resetting and a writing voltage generating part 151 for generating a resetting voltage ($HV_1$) in writing.

The operation part 17 includes a spread button 170 for specifying a spread mode, a continuous writing button 171 for specifying a continuous writing mode, and a page feed button 172 for specifying a page feed mode.

The communicating part 18 is designed to communicate with recoding media such as a USB (Universal Serial Bus) memory and an optical disk, a portable information terminal such as a cell phone and a PDA, and an external device such as a PC (Personal Computer). For example, a USB connector, a disk driver, or a network interface may be used.

The controller 10 includes a CPU and a ROM and a RAM for storing CPU program. The controller 10 controls the roller driving part 11, the solenoid driving part 12, the resetting light source driving part 13, the light-emitting element array driving part 14, the voltage application part 15 and the like so as to execute the spread mode, the page feed mode, or the continuous writing mode selected on the operation part 17. Setting of these modes may be made through input using the mode specification button on the operation part of the main body as well as external setting from the communicating part 18. Or, an image file to be written may be given in advance an attribute specifying the output mode in writing and the controller may automatically set the output mode based on this prior setting.

(Operation of the First Embodiment)

Figure 10:
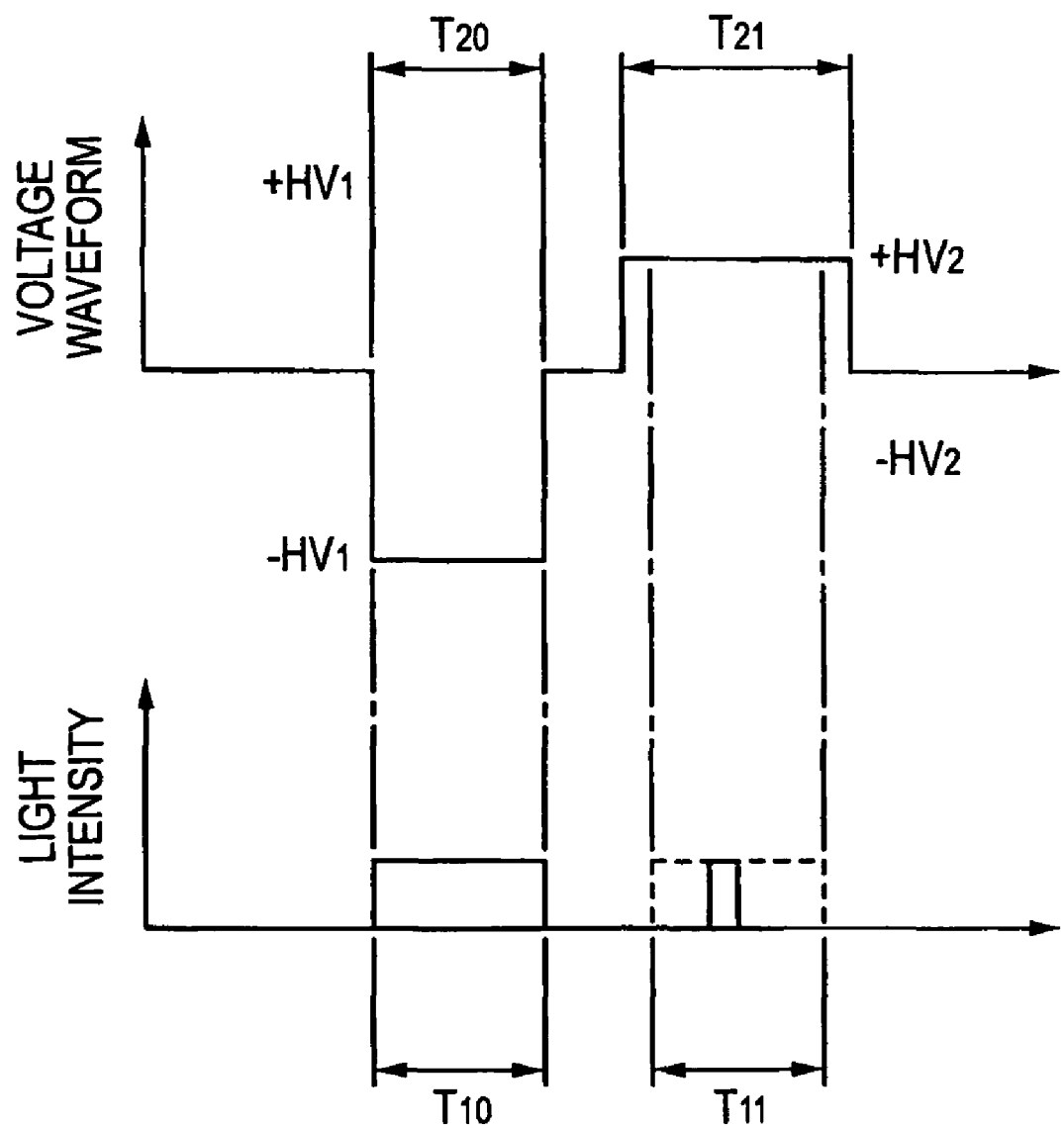
FIG. 10 shows the timing of each of the waveform of a voltage applied to a display medium and irradiation of light.
Figure 11A:
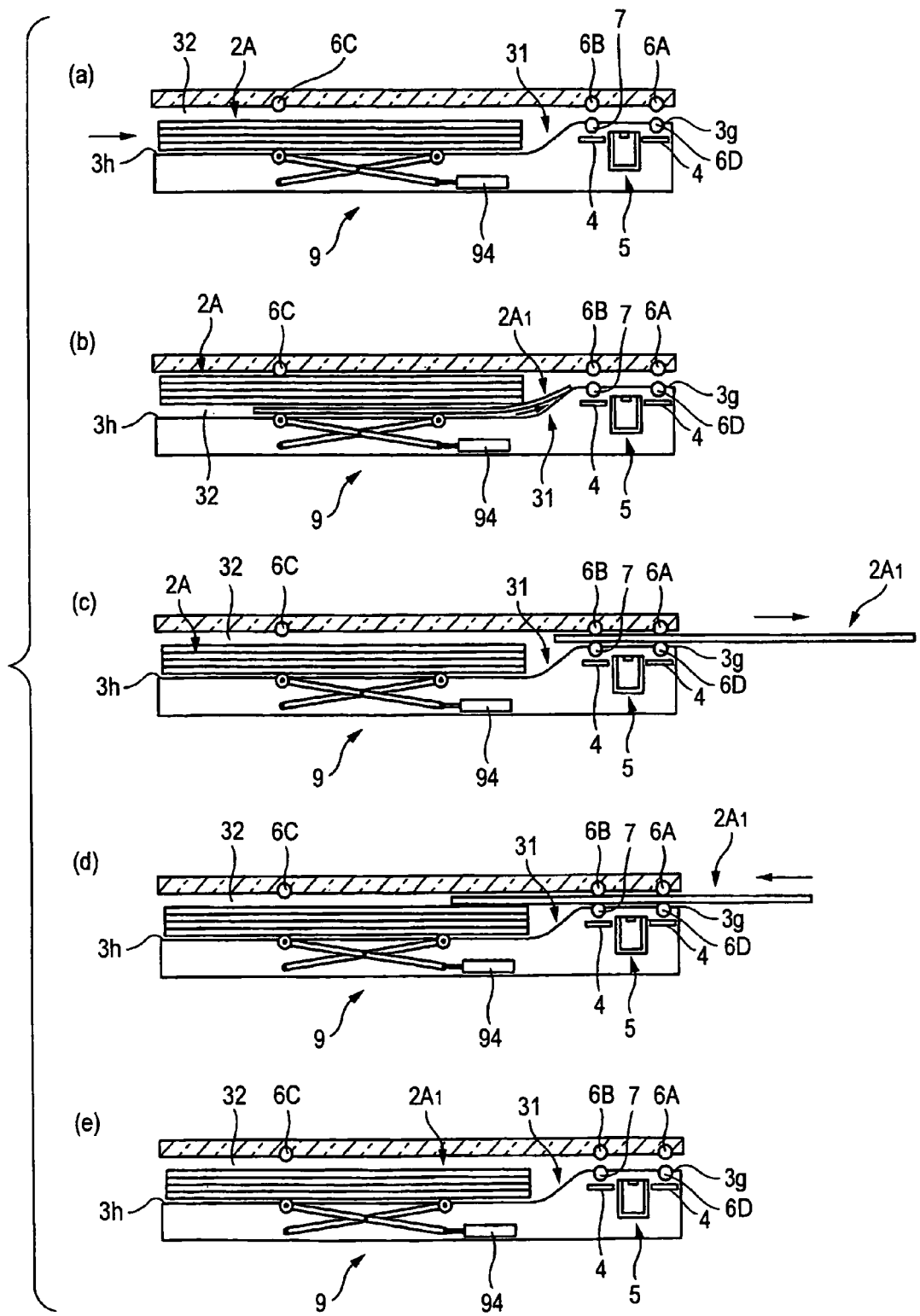
FIG. 11A is cross-sectional views showing a conveying operation of a display medium by an image writing device.
Figure 11B:
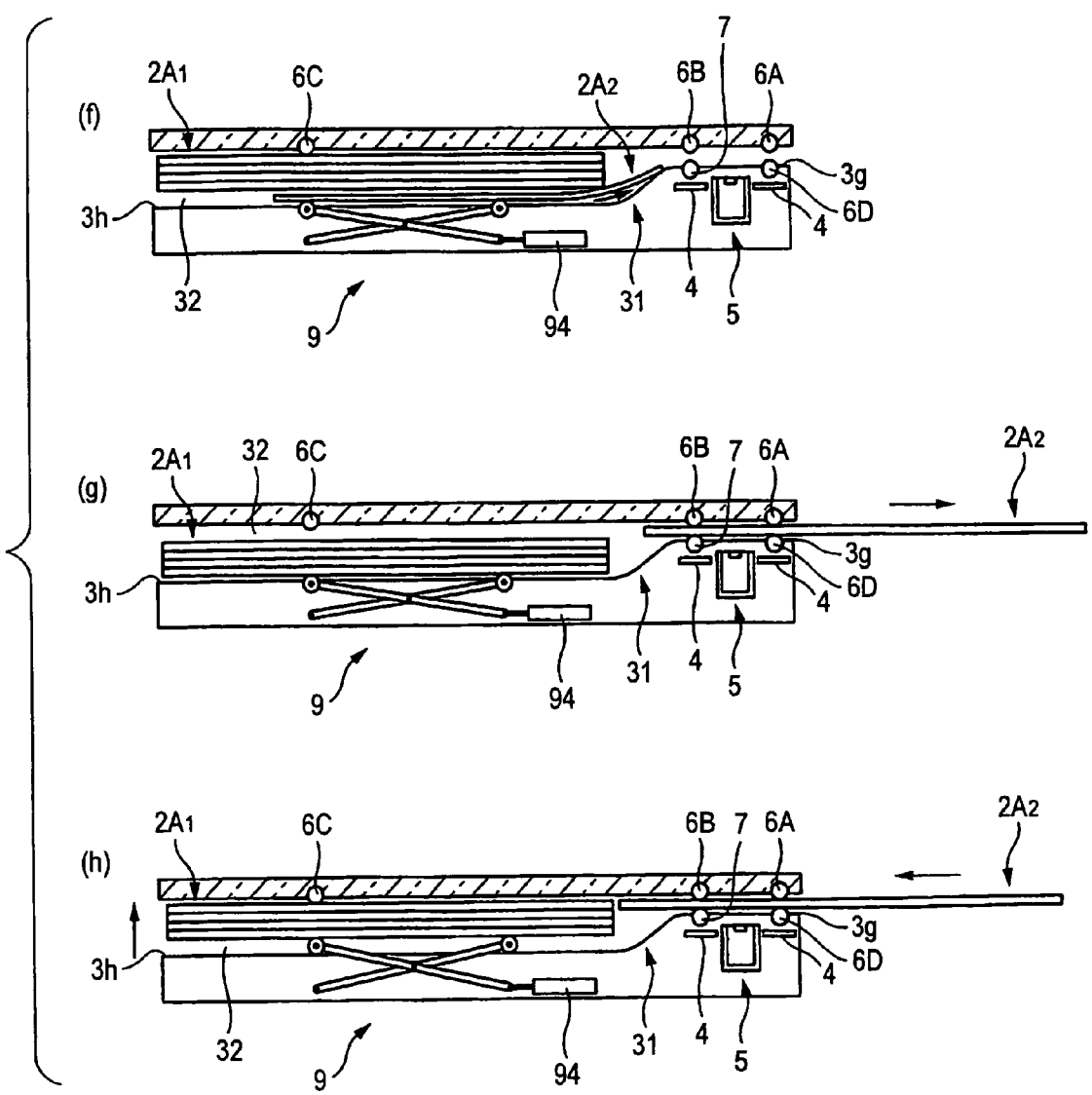
FIG. 11B is cross-sectional views showing a conveying operation of a display medium by an image writing device.

FIG. 10 shows the timing of each of the waveform of a voltage applied to a display medium and irradiation of light. FIG. 11 is a cross-sectional view showing the operation of the image writing device.

(1) Spread mode

As shown in FIG. 11(*a*), the user inserts a predetermined number of (for example five) display media 2A in a stacked state into the accommodating part 32 from the insertion port 3h of the main body 3. When the user presses the spread button 170 on the operation part 17 shown in FIG. 9, the controller 10 drives a motor (not shown) by way of the roller driving part 11 and rotates the conveyer rollers 6A through 6F and the power feed roller 7 in the direction the display medium 2A is conveyed to the entrance and exit port 3g. As shown in FIG. 11(*b*), the display medium 2A is conveyed to the entrance and exit port 3g. While the display medium 2A is conveyed out of the device body 3 from the entrance and exit port 3g, an image is written. In the cycles of writing to the display medium 2A, resetting operation and writing operation take place alternately.
(Resetting Operation)

In resetting operation, the controller 10 generates a resetting voltage from the resetting voltage generating part 150 of the voltage application part 15 and applies a pulse voltage $HV_1$ to one power feed roller 7 and 0V to the other power feed roller 7. The pulse voltage $HV_1$ is applied across the first and second electrodes 201A and 201B via the power receiving terminal 206.

The controller 10 generates resetting light from the resetting light source 4 by way of the resetting light source driving part 13. The time period $T_{10}$ in which resetting light is irradiated is almost the same as the voltage application time period $T_{20}$ as shown in FIG. 10.

When the resetting light is irradiated onto the rear surface 2b of the display medium 2A, the resetting light passes through the second substrate 200B and the second electrode 201B and reaches the photoconductive layer 204. The photoconductive layer 204 has its resistance value reduced upon receiving light. The partial pressure of the liquid crystal layer 202 determined by the impedance ratio with the photoconductive layer 204 increases accordingly and the liquid crystal layer 202 turns into a planar phase with an increased reflectivity. In this way, the entire liquid crystal layer 202 of the display medium 2A is initialized into the planar phase.
(Writing)

The controller 10 generates a writing pulse voltage from the writing voltage generating part 151, applies a pulse voltage $HV_2$ to one power feed roller 7 and 0V to the other power feed roller 7. The pulse voltage $HV_2$ is applied across the first and second electrodes 201A and 201B via the power receiving terminal 206.

The controller 10 controls the light-emitting element array driving part 14 based on the image data read from the image storage part 16. The light-emitting element array driving part 14 controls sequential lighting of the light-emitting elements 50a of the light-emitting element array 50 on the writing head 5 in the main scan direction X. The light-emitting element array 50 projects image light onto the rear surface 2b of the display medium 2A. The time period $T_{11}$ in which image light is irradiated is set shorter than the voltage application time period $T_{21}$ as shown in FIG. 10. In the time period $T_{11}$ in which image light is irradiated, the light-emitting elements 50a are lighting-controlled and sequentially scanned in the main scan direction X. Lighting control of the light-emitting elements 50a may be made to all light-emitting elements 50a at the same time or sequentially in predetermined units.

When the image light is irradiated onto the rear surface 2b of the display medium 2A, the image light passes through the second substrate 200B and the second electrode 201B and reaches the photoconductive layer 204.

In the area where light has been irradiated, the resistance value of the photoconductive layer 204 is reduced. The partial pressure of the liquid crystal layer 202 determined by the impedance ratio with the photoconductive layer 204 increases over Vfpe and the liquid crystal layer 202 turns into a planar phase with an increased reflectivity. The area of the liquid crystal layer where light has not been irradiated shows a partial pressure in a range between Vpfu and Vfpu inclusive. The liquid crystal layer changes from a planar phase to a focal conic phase that transmits light. The area of the liquid crystal layer 202 where light is irradiated after writing operation maintains the planar phase and the illumination light appears whitish with the reflected light because of a large reflectivity. The area where light is not irradiated appears blackish while the illumination light passing through the liquid crystal layer 202 is absorbed by the light-absorbing layer 205 since the liquid crystal layer 202 changes from the planar phase to the focal conic phase. The black-and-white pattern is visible as an image from the front surface 2a of the display medium 2A. This image is retained for a long period after a voltage is no longer applied across the first and second electrodes 201A, 201B.

In this way, the display medium 2A onto which an image is written while being conveyed out of the device body 3 stops in the state shown in FIG. 11(c). In this state, the display medium 2A is rigid to some extent so that the end of the display medium 2A is held by the conveyer rollers 6A, 6B, 6D and the power feed roller 7 and is maintained almost flat. It is thus possible to directly browse an image written onto the display medium $2A_1$, for example the image on the first page.

Next, the controller 10 controls the roller driving part 11 to drive the motor in reverse direction and rotates the conveyer rollers 6A through 6F and the power feed roller 7 in reverse direction. The controller 10 pulls the display medium $2A_1$ into the device body 3 and returns the display medium $2A_1$ to the lowermost layer as shown in FIGS. 11(d) and 11(e).

Next, same as the procedure mentioned earlier, the controller 10 conveys the display medium $2A_2$ in the lowermost layer out of the device body 3 and writes for example the image on the second page on the display medium $2A_2$ as shown in FIGS. 11(f) and 11(g).

Next, the controller 10 drives the elevating solenoid by way of driving force of the solenoid driving part 12 and elevates the conveyer rollers 6E, 6F until the display medium $2A_1$ reaches the conveyer roller 6C. Next, the controller 10 rotates, by way of the roller driving part 11, the conveyer rollers 6A through 6F and the power feed roller 7 in reverse direction to return the display medium $2A_2$ on which the image on the second page is written somewhat toward the accommodating part 32. In this way, the display medium $2A_1$ displaying the image on the first page and the display medium $2A_2$ displaying the image on the second page are arranged in a spread state.
(2) Continuous Writing Mode In case the continuous writing button 171 shown in FIG. 9 is pressed, images are sequentially written onto a plurality of display media 2A accommodated in the accommodating part 32 by repeating the operations shown in FIGS. 11(b) to 11(e). As the image-written display media 2A are sequentially conveyed to the uppermost layer (window side) of the accommodating part 32, the display media 2A are accommodated in the accommodating part 32 with the order of written pages maintained. A display medium 2A with an image written thereon is ejected from the case with a portion remaining therein so that the display medium 2A may be arranged to be pulled out. For example, in case a display medium 2A is stopped in a cantilevered state for a short time period with the conveyer roller 6A after wiring and it is detected that the roller is rotated in the medium ejection direction by the pulling operation in the meantime, the roller may be driven and ejected. After completion of writing is confirmed, the counter value of the number of display media 2A held in the case is decremented as required, and the next display medium 2A is conveyed from the accommodating part 32 and an image is written onto the display medium 2A.
(3) Page Feed Mode In case the page feed button 172 shown in FIG. 9 is pressed, it is possible to sequentially feed display media 2A with images written thereon from the lowermost layer to the uppermost layer and browse the display images on the display media 2A through the transparent plate 30 by repeating the operations shown in FIGS. 11(b) to 11(e). The display medium 2A may be brought closer to the transparent plate 30 by using the elevating mechanism 9 each time an image is browsed.

Second Embodiment

Figure 12:
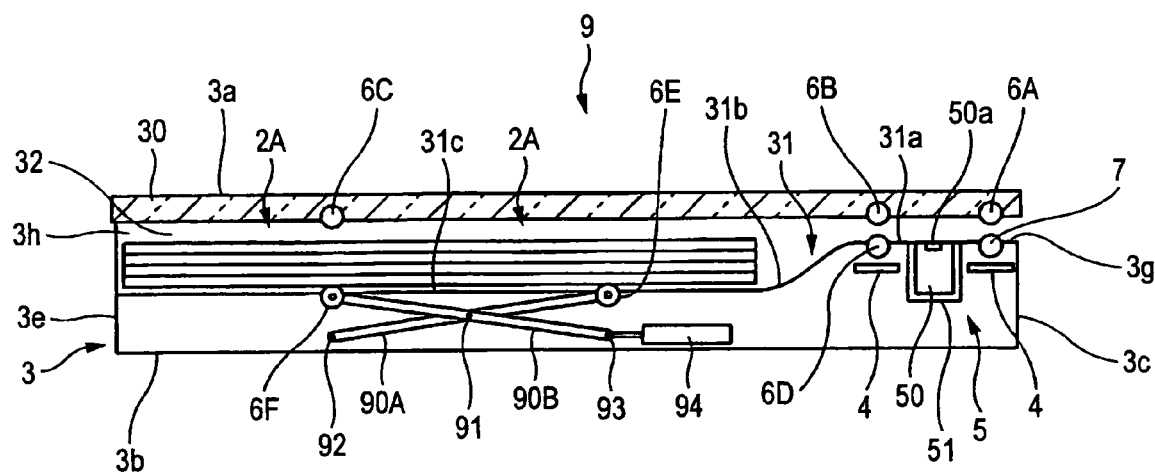
FIG. 12 is a cross-sectional view showing an image writing device according to a second exemplary embodiment of the invention.

FIG. 12 is a cross-sectional view showing an image writing device according to a second exemplary embodiment of the invention. While an image is written onto a display medium 2A while the display medium 2A is being conveyed out of the device body 3 in the first embodiment, the user may wish not to place the display medium 2A with an image written thereon in a state where the display medium 2A protrudes from the writing device to allow forcible pulling operation unlike the first embodiment in order to protect security of the image to be written. In the second embodiment, an image is written onto a display medium 2A while the display medium 2A is being conveyed into the device body 3.

The image writing device 1 according to this embodiment differs from that of the first embodiment in that the resetting light source 4 is arranged closer to the entrance and exit port 3g than the writing head 5 and the position of the power feed roller 7 is replaced with that of the conveyer roller 6D and brought near the entrance and exit port 3g.

Figure 13:
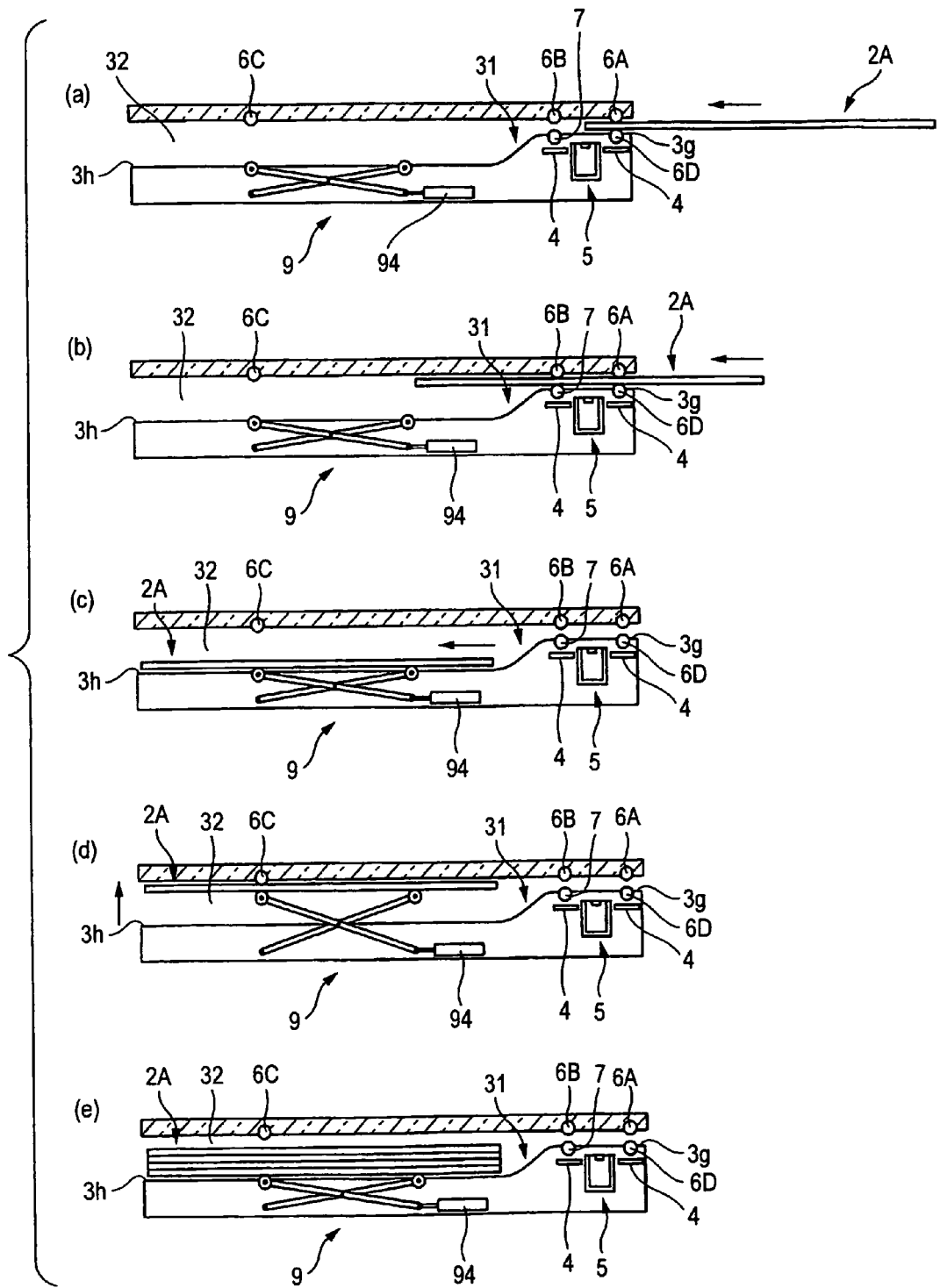
FIG. 13 is a cross-sectional view showing an operation of an image writing device according to the second exemplary embodiment of the invention.

FIG. 13 is a cross-sectional view showing the operation of the image writing device according to the second embodiment of the invention. For example, in case the continuous writing button 171 shown in FIG. 9 is pressed, continuous writing takes place as shown in FIGS. 13(a) through 13(e).

As shown in FIG. 13(a), when the user inserts the display medium 2A into the entrance and exit port 3g, a medium sensor (not shown) detects that the display medium 2A is inserted into the entrance and exit port 3g and the controller 10 controls the roller driving part 11 so as to pull the display medium 2A into the device body 3 based on the detection by the medium sensor. As shown in FIGS. 13(b) and 13(c), the roller driving part 11 drives to rotate the conveyer rollers 6A through 6F and the power feed roller 7, which convey the display medium 2A into the accommodating part 32.

While the display medium 2A is being conveyed into the device body 3, the controller 10 generates a resetting voltage from the resetting voltage generating part 150 of the voltage application part 15 and applies a pulse voltage $HV_1$ to one power feed roller 7 and 0V to the other power feed roller 7. The controller 10 generates resetting light from the resetting light source 4 by way of the resetting light source driving part 13.

Next, the controller 10 generates a writing pulse voltage from the writing voltage generating part 151, applies a pulse voltage $HV_2$ to one power feed roller 7 and 0V to the other power feed roller 7. The controller 10 controls the light-emitting element array driving part 14 based on the image data read from the image storage part 16 and performs lighting control of the light-emitting elements 50a of the light-emitting element array 50 on the writing head 5 in the main scan direction X. The light-emitting element array 50 projects image light onto the rear surface 2b of the display medium 2A to write an image onto the display medium 2A.

The display medium 2A with an image written thereon reaches the flat surface 31c of the accommodating part 32. As shown in FIG. 13(d), the elevating mechanism 9 operates to elevate the display medium 2A until the display medium 2A abuts the conveyer roller 6C. The user can browse the display image on the display medium 2A through the transparent plate 30.

By sequentially inserting the display media 2A into the entrance and exit port 3g, the display media 2A with images written thereon are collected in the accommodating part 32 as shown in FIG. 13(e).

In the second embodiment also, same as the first embodiment, the continuous writing mode, page feed mode or spread mode can be executed. For example, a plurality of display media 2A with images written thereon are accommodated in the accommodating part 32. The display medium on the first page or second page is conveyed out of the device body 3 with a portion thereof left inside the device body 3 and the display medium 2A on the second page or first page in the uppermost layer in the accommodating part 32 is elevated with the elevating mechanism 9. This provides the spread state.

Third Embodiment

Figure 14:
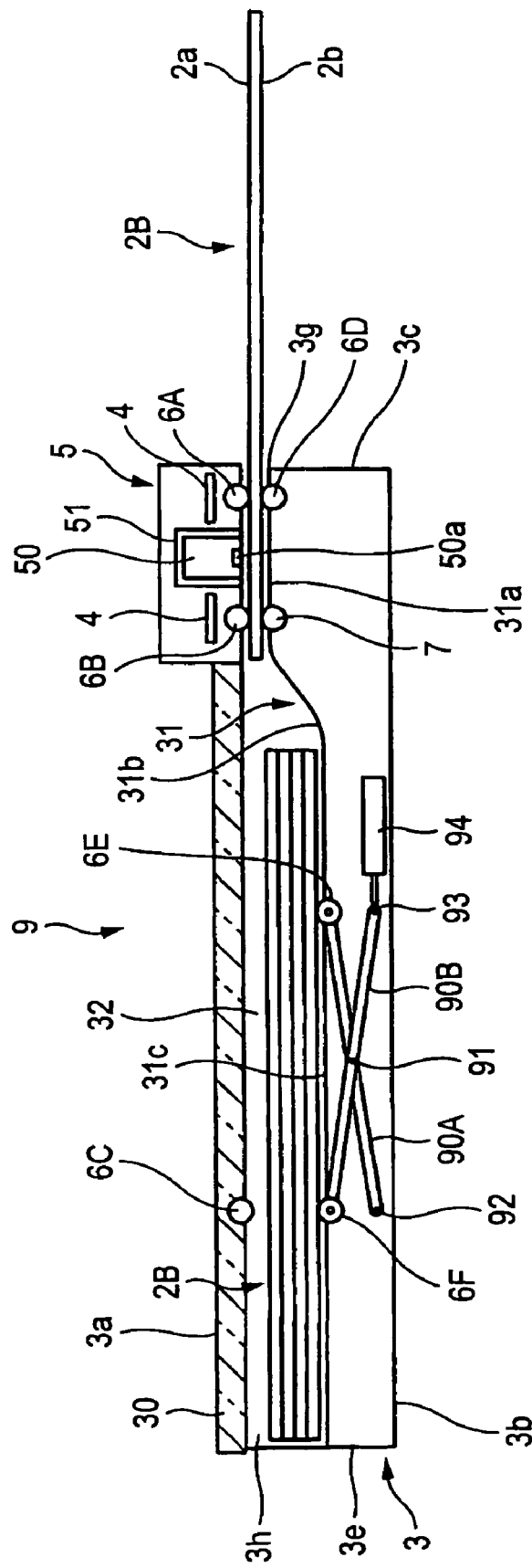
FIG. 14 is a cross-sectional view showing an image writing device according to a third exemplary embodiment of the invention.

FIG. 14 is a cross-sectional view showing an image writing device according to a third exemplary embodiment of the invention. While the rear writing type display medium 2A is used in the first and second embodiments, the front writing type display medium 2B is used in the third embodiment.

The device body 3 according to this embodiment is the same as the first embodiment except that a resetting light source 4 and a writing head 5 are arranged in the upper area of the device body 3 near the entrance and exit port 3g and the resetting light source 4 and the writing head 5 are covered by a sub-case 33 formed by a light-shielding metal or the like.

Figure 15:
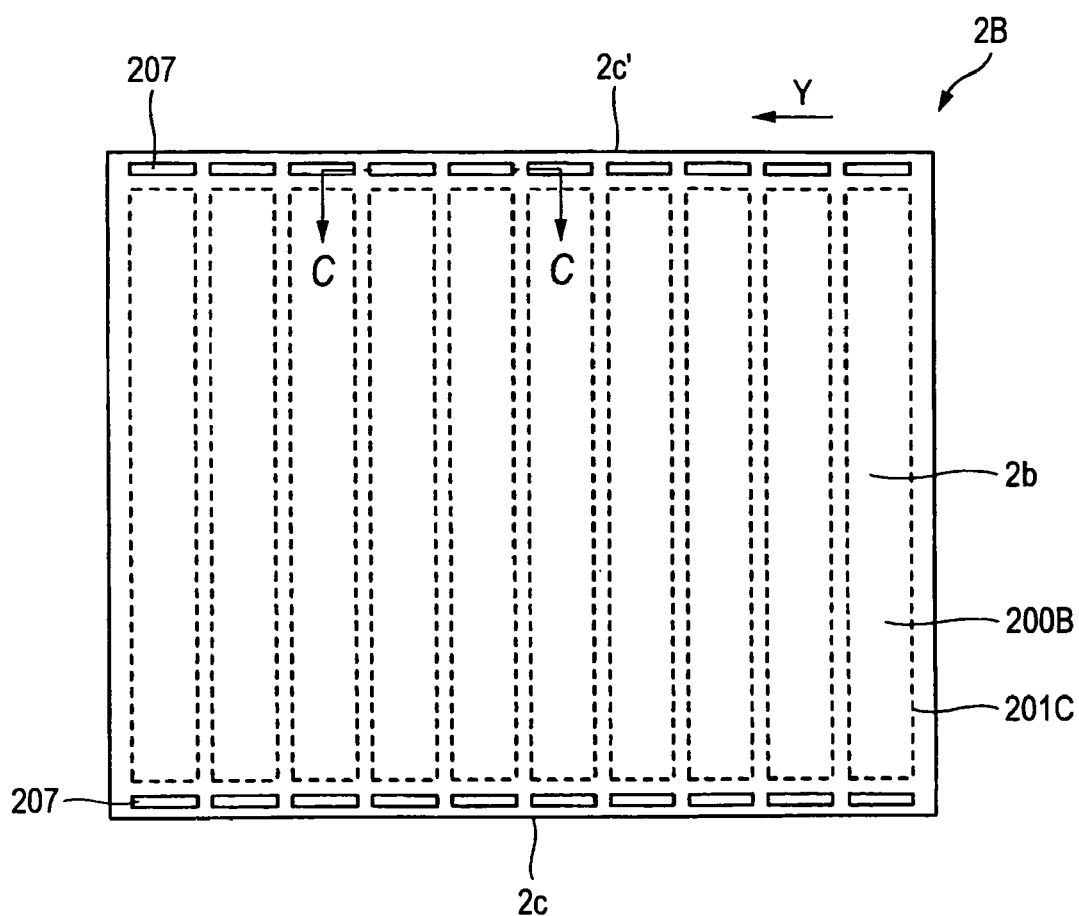
FIG. 15 is a plan view of the rear surface of a display medium according to the third exemplary embodiment of the invention.
Figure 16:
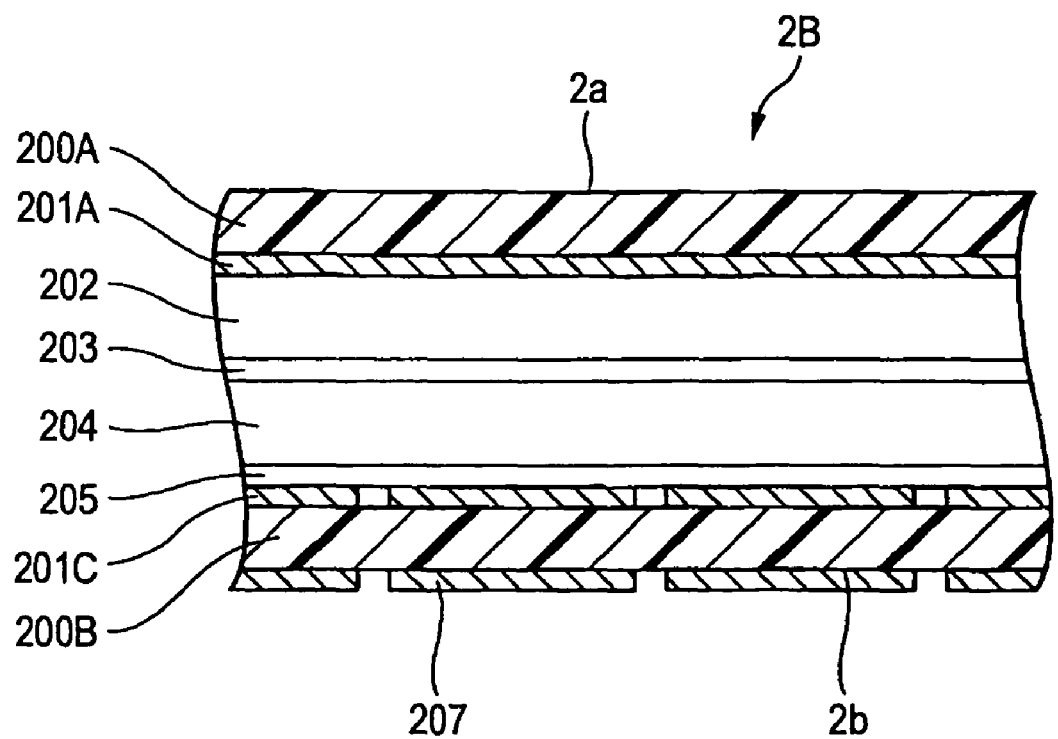
FIG. 16 shows the layer configuration of a display medium according to the third exemplary embodiment of the invention.

FIG. 15 is a plan view of the rear surface 2b of the display medium 2B. FIG. 16 shows the layer configuration of the display medium 2B according to this embodiment.

As shown in FIGS. 15 and 16, the display medium 2B includes a plurality of divided power receiving terminals 207 made of a conductive material such as copper or a copper alloy formed in two rows in the sub-scan direction Y on the rear surface 2b near the left and right side surfaces 2c, 2c'.

(Layer Configuration of Display Medium)

As shown in FIG. 16, the display medium 2B includes: transparent first and second substrates 200A, 200B arranged opposite to each other, the substrates 200A, 2008 formed by PET or the like; a first electrode 201A that is a transparent overall electrode formed by an ITO or the like inside the first substrate 200A; a plurality of divided electrodes 201C that are transparent overall electrodes formed by an ITO or the like inside the second substrate 200B; a liquid crystal layer 202 arranged inside the first electrode 201A and made of a cholesteric liquid crystal whose reflectivity changes with the applied voltage; a photoconductive layer 204 arranged relative to the liquid crystal layer 202 with an isolation layer 203 placed in between, the resistance value of the photoconductive layer 204 decreasing with radiation of light; a light-absorbing layer 205 arranged between the photoconductive layer 204 and the second substrate 200B; and the pair of divided power receiving terminals 207 formed on the rear surface 2b of the second substrate 200B.

One divided power receiving terminal 207 of the pair of divided power receiving terminals 207 is connected to the first electrode 201A via a conductive member (not shown). The other divided power receiving terminal 207 is electrically connected to the divided electrode 201C via a connecting part (not shown) such as a through hole.

The plurality of divided electrodes 201C are arranged in the sub-scan direction Y. The width of a single divided electrode 201C is preferably smaller than the width of the case 51 of the writing head 5 in order to prevent exposure by extraneous light, for example one second to one third the width of the case 51.

(Operation of the Image Writing Device)

When resetting light is irradiated onto the front surface 2a of the display medium 2B, the resetting light passes through the first substrate 200A, the first electrode 201A, the liquid crystal layer 202 and the isolation layer 203 and reaches the photoconductive layer 204. The photoconductive layer 204 has its resistance value reduced upon receiving light. The partial pressure of the liquid crystal layer 202 determined by the impedance ratio with the photoconductive layer 204 increases accordingly and the liquid crystal layer 202 turns into a planar phase with an increased reflectivity. In this way, the entire liquid crystal layer 202 of the display medium 2B is initialized into the planar phase.

When image light is irradiated onto the rear surface 2a of the display medium 2B, the image light passes through the first substrate 200A, the first electrode 201A, the liquid crystal layer 202 and the isolation layer 203 and reaches the photoconductive layer 204.

In the area of the liquid crystal layer 202 where light has been irradiated, the planar phase to reflect light is maintained. In the area where light has not been irradiated, the planar phase changes to the focal conic phase to transmit light. The area of the liquid crystal layer 202 where light is irradiated after writing operation maintains the planar phase and the illumination light appears whitish with the reflected light because of a large reflectivity. The area where light is not irradiated appears blackish while the illumination light passing through the liquid crystal layer 202 is absorbed by the light-absorbing layer 205. The black-and-white pattern is visible as an image from the front surface 2a of the display medium 2B. This image is retained for a long period after a voltage is no longer applied across the first electrode 201A and the divided electrode 201C.

Fourth Embodiment

Figure 17:
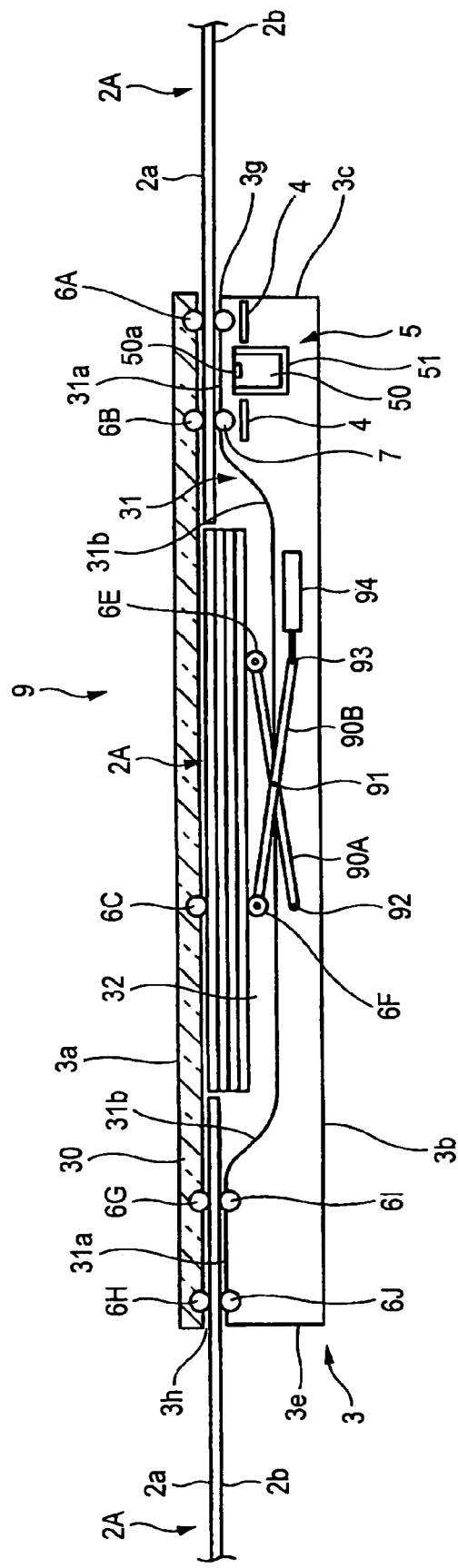
FIG. 17 is a cross-sectional view showing an image writing device according to a fourth exemplary embodiment of the invention.

FIG. 17 is a cross-sectional view showing an image writing device according to a fourth exemplary embodiment of the invention. While an entrance and exit port 3g for the display medium 2A is arranged on one side of the device body 3 in the first through third embodiments, entrance and exit ports 3g, 3i are arranged on both sides in this embodiment. An insertion port 3h for inserting a plurality of display media 2A in the accommodating part 32 is arranged in the side surface 3f.

In the fourth embodiment, a 3-page spread mode is available on top of the spread mode, page feed mode and continuous writing mode described in the first embodiment. The 3-page spread mode is explained below.

Same as the first embodiment, the image on the third page is written onto a display medium 2A. The display medium 2A is conveyed leftward in FIG. 17 and retained with a portion of the display medium 2A left inside the device body 3. Onto a display medium 2A in the center and a display medium 2A on the right are written images on the first and second pages similarly to the description of the spread mode in the first embodiment. The display medium 2A with the image on the second page written thereon is brought near the transparent plate 30 with the elevating mechanism 9 to provide a 3-page spread state.

Other Embodiments

The invention is not limited to the foregoing embodiments but may be modified without departing from the scope and spirit of the invention. Components of the foregoing embodiments may be arbitrarily combined without departing from the scope and spirit of the invention.

While an optical writing device is used as a display medium in the foregoing embodiments, other display media may be used such as a thermosensitive recording medium using a leuco die, a liquid crystal having a memory characteristic typified by ferroelectric liquid crystal, an electrophoresis system to switch display by moving charged particles, a particle rotation system to switch display by rotating charged particles, and a magnetic migration system to switch display by moving particles with magnetism. In particular, as a medium using a system to display images with electric stimulation, a memory type display medium (so-called electronic paper) is preferably used that stores an image with the display being erased after the electric stimulation is removed. Images sequentially written onto a plurality of display media accommodated in an accommodating part are retained in the absence of a power source. Images may be overwritten and a plurality of pages may be displayed on a small number of media.

What is claimed is:

1. An image writing device comprising:
    a case including an accommodating part that accommodates a plurality of display media stacked, a port which is communicated with the accommodating part and through which the display media enter and exit the case, and a window through which an image on a display surface of a display medium can be externally browsed, the image being written in the display medium by applying external stimulation;
    a conveying part that conveys the display medium into and out of the case through the port; and
    a writing part arranged near the port of the case, the writing part applying the external stimulation to the display medium to write the image in the display medium when the display medium is conveyed into or out of the case by way of the conveying part.

2. The image writing device according to claim 1, wherein the case includes an elevating mechanism that elevates and lowers, in a direction directed toward the window, the display media accommodated in the accommodating part.

3. The image writing device according to claim 1, wherein the conveying part includes a feed mechanism that feeds to the port a display medium positioned in the remotest position from the window among the plurality of display media accommodated in the accommodating part.

4. The image writing device according to claim 1, further comprising a control unit configured to control the conveying part and the writing part in a control mode, the control mode including: writing a first image in a first display medium positioned in the remotest position from the window while the first display medium is being conveyed out of the case through the port with a portion of the first display medium left inside the case; returning the first display medium to the closest position to the window in the accommodating part; writing a second image in a second display medium positioned in the remotest position while the second display medium is being conveyed out of the case through the port; and retaining a portion of the second display medium in the case so as to provide the first and second images spread at the window.

5. The image writing device according to claim 1, further comprising a control unit configured to control the conveying part and the writing part in a control mode, the control mode including: conveying a display medium position in the remotest position from the window, out of the case through the port with a portion of the display medium left inside the case; and conveying the display medium into the case to return the display medium to the closest position to the window in the accommodating part.

6. The image writing device according to claim 1, further comprising a control unit configured to control the conveying part and the writing part in a control mode, the control mode repeating: writing an image in the display medium in the remotest position form the window in the accommodating part while the display medium is being conveyed out of the case through the port with a portion of the display medium left inside the case; and returning the display medium to the closest position to the window in the accommodating part.

7. The image writing device according to claim 1, further comprising a control unit configured to control the conveying part and the writing part in a control mode, the control mode repeating: conveying a display medium position in the remotest position from the window, out of the case through the port with a portion of the display medium left inside the case; and writing an image in the display medium when the display medium is conveyed into the case to return the display medium to the closest position to the window in the accommodating part.

8. The image writing device according to claim 1, further comprising a control unit configured to control the conveying part and the writing part in a control mode, the control mode repeating: writing an image in a display medium inserted into the port while the display medium is conveyed into the case; and accommodating the display medium into the accommodating part.

9. An image writing device comprising:

a case including an accommodating part that accommodates a plurality of display media stacked, a pair of ports communicated with the accommodating part and arranged at respective ends of the case in the direction of conveying the display medium, each of through which the display media enter and exit the case, and a window through which an image on a display surface of a display medium can be externally browsed, the image being written in the display medium by applying external stimulation;

a conveying part that conveys the display medium into and out of the case through the pair of ports; and a writing part arranged near at least one port of the pair of ports, the writing part applying the external stimulation to the display medium to write the image in the display medium when the display medium is conveyed into or out of the case through the at least one port by way of the conveying part.

10. The image writing device according to claim 1, wherein the window is formed in the case such that the display surface of the display medium stored in the case faces the window.

11. The image writing device according to claim 9, wherein the window is formed in the case such that the display surface of the display medium stored in the case faces the window.

* * * * *